(12) United States Patent
Kaler et al.

(10) Patent No.: US 7,567,586 B2
(45) Date of Patent: Jul. 28, 2009

(54) ABOVE-TRANSPORT LAYER MESSAGE PARTIAL COMPRESSION

(75) Inventors: Christopher G. Kaler, Sammamish, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 11/263,196

(22) Filed: Oct. 31, 2005

(65) Prior Publication Data

US 2007/0098018 A1    May 3, 2007

(51) Int. Cl.
    *H04J 3/22* (2006.01)
(52) U.S. Cl. ...................................... 370/469
(58) Field of Classification Search .................. None
    See application file for complete search history.

(56) References Cited

U.S. PATENT DOCUMENTS

| | | | | |
|---|---|---|---|---|
| 6,737,992 | B1 | 5/2004 | Wolthuis | 341/55 |
| 6,766,147 | B2 | 7/2004 | O'Hare et al. | 455/72 |
| 6,807,173 | B1 | 10/2004 | Lee et al. | 370/389 |
| 6,850,948 | B1* | 2/2005 | Krasinski | 707/101 |
| 6,883,137 | B1* | 4/2005 | Girardot et al. | 715/242 |
| 2002/0138248 | A1 | 9/2002 | Corston-Oliver et al. | 704/1 |
| 2003/0233478 | A1 | 12/2003 | Chuah et al. | 709/247 |
| 2004/0215830 | A1* | 10/2004 | Shenfield | 709/246 |
| 2005/0187757 | A1 | 8/2005 | Mathur et al. | 704/9 |
| 2005/0188054 | A1 | 8/2005 | Riihijarvi et al. | 709/218 |

FOREIGN PATENT DOCUMENTS

WO    WO/00/04442    1/2000

OTHER PUBLICATIONS

W3C Note, Simple Object Access Protocol (SOAP) 1.1, W3C, 47 pages, 2000.*
Liefke et al, XMill: an Efficient Compressor for XML Data, ACM, 12 pages, 2000.*
Werner et al, Compressing SOAP Messages by using Differential Encoding, IEEE, 8 pages, 2004.*
Brian Goodman, "*Squeezing SOAP*," Mar. 1, 2003, IBM Intranet Technology, *available at* http://www-128.ibm.com/developerworks/webservices/library/ws-sqzsoap.html (PDF enclosed entitled Article 1, 5 pages).
John Sweeney, et al., "*Efficient SIP based Presence and IM Services with SIP message compression in IST OPIUM*," Sep. 26, 2003, Cork Institute of Technology, Adaptive Wireless Systems, *available at* http://www.ist-opium.org/bluepapers/CIT%20-%20Blue%20Paper.doc (PDF enclosed entitled Article 2, 4 pages).
Matthew Kwan, "*How SNOW works*," Darkside Technologies, *available at* http://www.darkside.com.au/snow/description.html (PDF enclosed entitled Article 3, 3 pages).

(Continued)

*Primary Examiner*—Frank Duong
(74) *Attorney, Agent, or Firm*—Workman Nydegger (57) ABSTRACT

Compression of a portion of a message at above a transport layer in a protocol stack. In the transmission direction, the message is accessed in a form that includes a number of initially parseable components, at least one of which being in compressed form. The message also includes a marker that identifies the component(s) that are compressed. The message is then passed to the transport layer in further preparation for transmission. In the receiving direction, the message is received from the transport layer. The message is initially parsed, and then the compressed component(s) are identified based on the marker.

20 Claims, 4 Drawing Sheets

OTHER PUBLICATIONS

Jeffery N. Ladino, "*Data Compression Algorithms*," 1996, College of Computer Science at Northeastern University, Honors Project, *available at* http://www.ccs.neu.edu/groups/honors-program/freshsem/19951996/jnl22/jeff.html (PDF enclosed entitled Article 4, 7 pages).

* cited by examiner

Fig. 1

Fig. 2

# ABOVE-TRANSPORT LAYER MESSAGE PARTIAL COMPRESSION

BACKGROUND

Computing technologies have transformed our world. However, in order to prove useful, computing relies on the ability to access information, whether that information is accessed over a network, or from a local storage device. In order to reduce the amount of network bandwidth needed to communicate information over a network, and in order to reduce the amount of storage space needed to store information, information is often compressed using one or more of a variety of compression technologies. Compression takes advantage of redundancy in the information to thereby reduce the size of the information.

In lossless compression, compression. serves to reduce the size of information with no loss of information. There is, however, a theoretical limit (often referred to as the "informational entropy") to how far information may be compressed in lossless form depending on the level of redundancy. In lossy compression, however, compression may typically be performed to a smaller size, but with some loss in information.

Most typically, compression occurs at the transport or protocol level in the protocol stack when transmitting a message in compressed form. Using this mechanism, all the data in the message is compressed, including information needed to decide what action should be taken upon the rest of the data. The data is often wrapped to indicate that the data is in compressed form. In order to determine what action is required on the data, it is often required to decompress all of the data. Sometimes, after the extensive processing needed to decompress the data, it is discovered that no action is to be taken on the data. This is an inefficient use of limited processing resources.

For instance, suppose that a message is compressed and transmitted to a destination computing system via multiple intermediary computing systems. Each intermediary computing system might decompress the entire message, only to determine that the only thing that is required is to forward the data in compressed form to the next computing system. Thus, the intermediary performed extensive processing needed to decompress and recompress the message only to access the address of the next intermediary or destination.

BRIEF SUMMARY

The principles of the present invention relate to the compression of a portion of a message at above a transport layer in a protocol stack. In the transmission direction, the message is accessed in a form that includes a number of initially parseable components, at least one of which being in compressed form. The message also includes a marker that identifies the component(s) that are compressed. The message is then passed to the transport layer in further preparation for transmission. In the receiving direction, the message is received from the transport layer. The message is initially parsed, and then the compressed component(s) are identified based on the marker.

Since the message includes uncompressed and compressed components, the decision as to whether or not to compress may be made for each of the message components, rather than simply applying or not applying compression to the entire message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention related to the compression and decompression of portions of a message at above the transport layer in a protocol stack. First, a general computing system will be described with respect to FIG. 1, as being a suitable computing system that may be used to practice the principles of the present invention. Then, the principles of the present invention will be described with respect to FIGS. 2 through 5.

Figure 1:
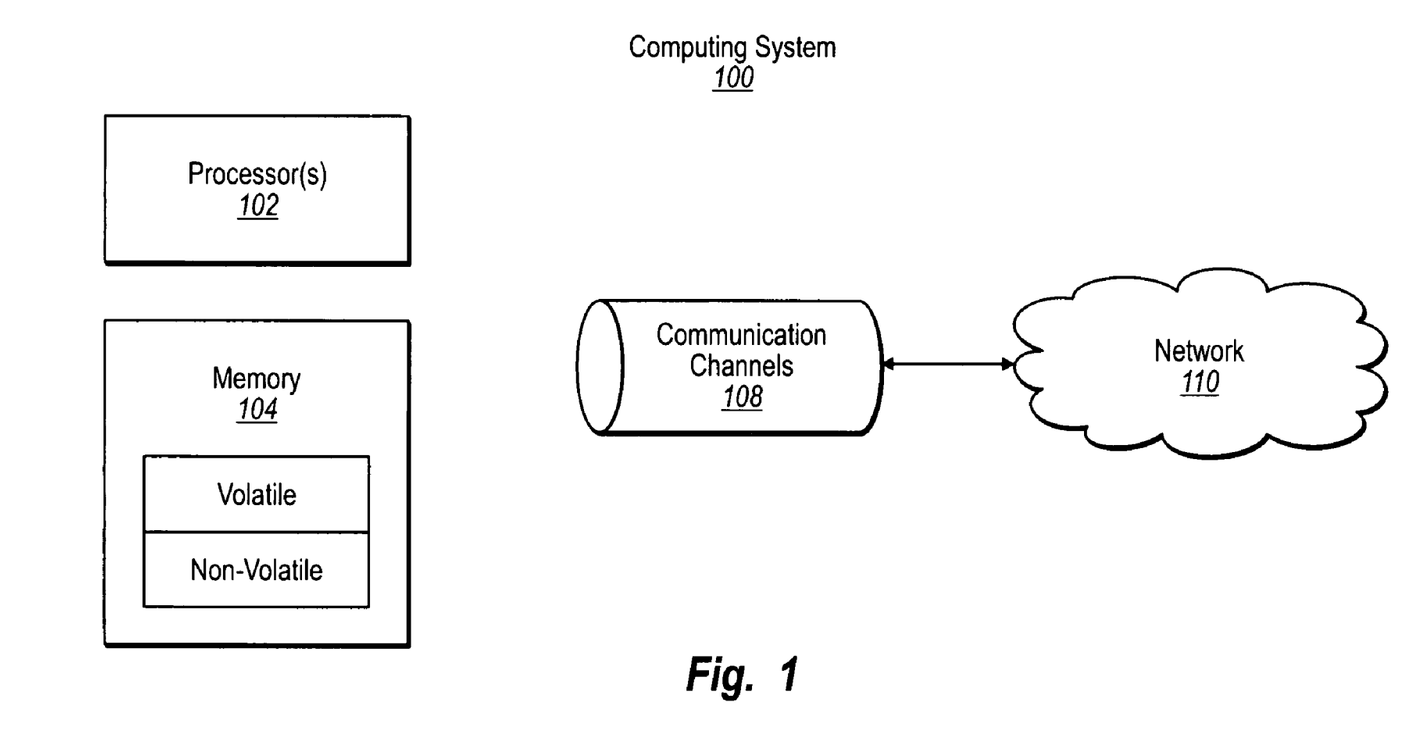
FIG. 1 illustrates a suitable computing system that may implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
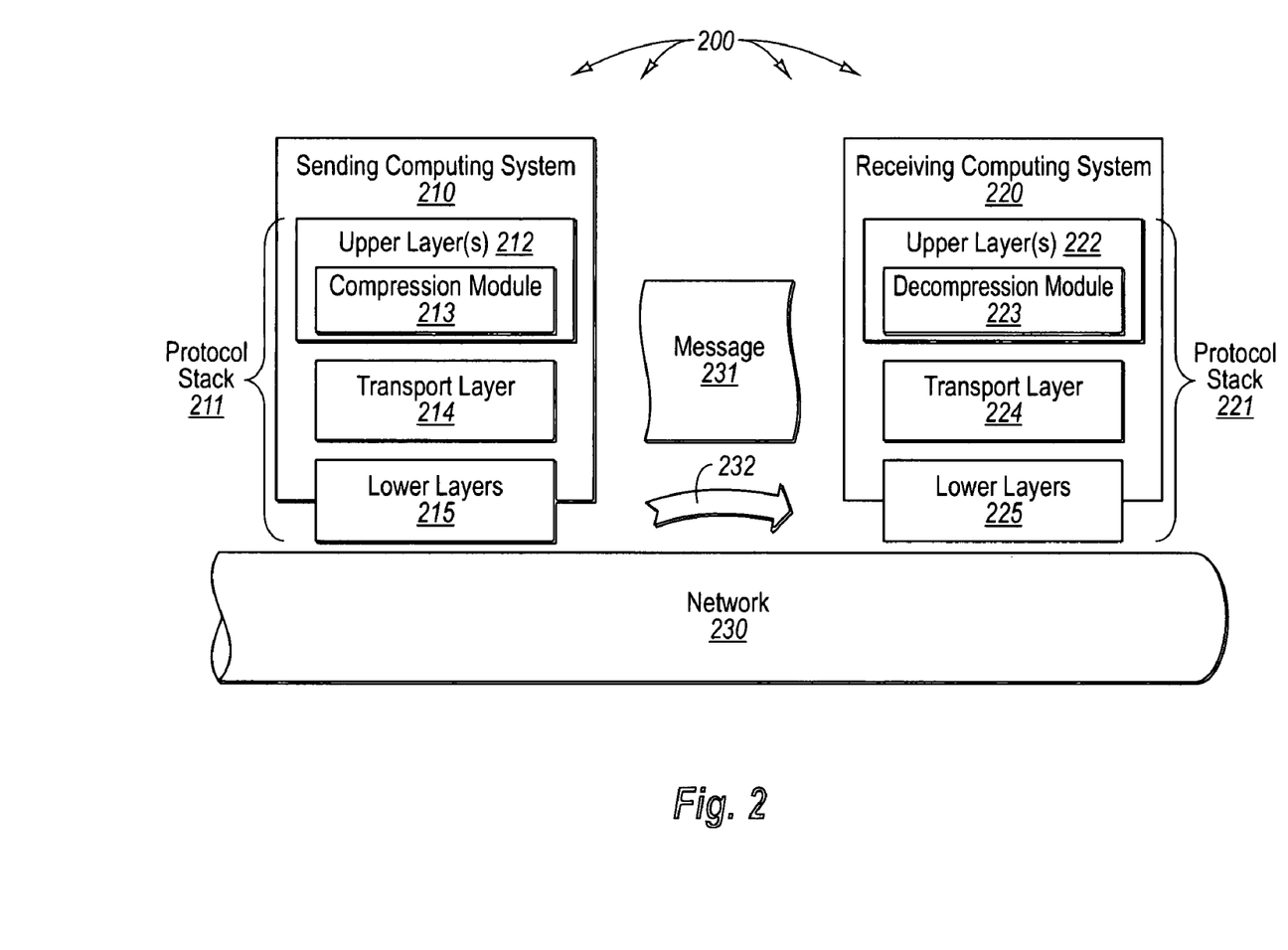
FIG. 2 illustrates a network environment in which the principles of the present invention may be employed.

FIG. 2 illustrates a network environment 200 in which the principles of the present invention may be employed. The network environment 200 includes a sending computing system 210 and a receiving computing system 220 that are able to communicate over network 230. For instance, sending computing system 210 use a protocol stack 211 to send a message 231 to the receiving computing system 220 over network 230 as represented by the arrow 232. The receiving computing system 220 may then use protocol stack 221 to receive the message 231.

Each of the sending computing system and the receiving computing system 220 may be structured as described above for the computing system 100 of FIG. 1, although that is not at all required. If structured in that manner, the network 230 of FIG. 2 may be structured as described above for the network 110 of FIG. 1. The network 110 may be, for example, a local area network, or a wide area network such as, for example, the Internet.

Although the sending computing system 210 is modified by the term "sending" in order to define its role with respect to the transmission of the specific message 231, the sending computing system may also receive messages from other computing systems. Furthermore, although the sending computing system 210 is shown as communicating with a single receiving computing system 220, the sending computing system 210 may communicate with numerous other computing systems. For instance, the sending computing system may potentially exchange messages with literally. millions of other computing systems if the network 230 is, for example, the Internet. Similarly, although the receiving computing system 220 is modified by the term "receiving". in order to define its role with respect to the receipt of the message 231, the receiving computing system may also send messages to sending computing system 210 or to other computing systems.

Each of the sending computing system 210 and the receiving computing system 220 includes a protocol stack that is used to communicate messages over the network 230. For instance, sending computing system 210 includes a protocol stack 211 that includes a transport layer 214 such as, for example, a HyperText Transport Protocol (HTTP) layer configured to prepare messages for transmission consistent with HTTP. In this description and in the claims, HTTP refers to any version of HTTP protocols including HTTP version 1.0, HTTP version 1.1, a subsequent version of HTTP, or any extension of an existing or subsequent version of HTTP, whether now developed or to be developed in the future. There are many other types of transport layers involving different protocols as will be apparent to one of ordinary skill in the art. The principles of the present invention are not limited to the particular protocol implemented by the transport layer 214.

The protocol stack 211 also includes upper layer(s) 212 which are configured above the transport layer 214 in the protocol stack 211. The upper layer(s) 212 may include a compression module 213 that is configured to perform compression of a portion of messages to be transmitted to the receiving computing system 220. An example of an upper layer that operates above a transport layer (such as an HTTP layer) is Simple Object Access Protocol (SOAP). In this description and in the claims, SOAP refers to any version of SOAP whether now existing or to be developed in the future, or any extension from those versions. Examples of existing versions of SOAP include SOAP version 1.1 and SOAP version 1.2.

The protocol stack 211 also includes lower layer(s) 215 that are configured. to interface between the transport layer 214 and the network 230. The lower layer(s) may implement any protocol suitable to appropriately interface the transport layer with the network. For instance, example protocols that may be implemented by lower layer(s) 215 may include for example User Datagram Protocol (UDP) over Internet Protocol (IP) (also referred to UDP over IP) or Transmission Control Protocol (TCP) over IP (also referred to as TCP over IP). Link layers and physical layers may also be included within the lower layer(s) 215. The operation of the sending computing system 210 in transmitting a message will be described in further detail with respect to FIG. 3.

The receiving computing system 220 likewise includes a protocol stack in the form of protocol stack 221. The protocol stack 221 may include similar components as described above for the protocol stack 211 of the sending computing system 210. Specifically, the protocol stack 221 includes a transport layer 224, upper layer(s) 222 above the transport layer 224, and lower layer(s) 225 below the transport layer 224. The layers 222, 224, and 225 may be similar to the layers 212, 214 and 225, respectively, illustrated and described above. The upper layer(s) 222 may include a decompression module 223 that serves to decompress a partially compressed message consistent with the principles of the present invention as will be described with respect to FIG. 4.

Figure 3:
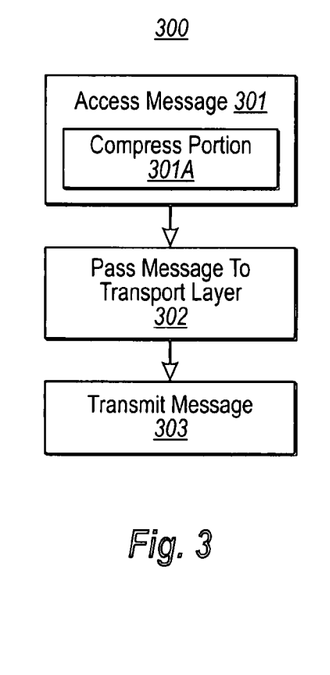
FIG. 3 illustrates a flowchart of a method for partially compressing a message above a transport layer in a protocol stack in accordance with the principles of the present invention.

Having described a particular network environment 200 in which the principles of the present invention may operate when partially compressing and transmitting a message, a method for transmitting such a message will now be described with respect to FIG. 3, which illustrates a flowchart of such the method 300. Referring to FIGS. 2 and 3 together, acts 301 and 302 of the method 300 may be performed by the upper layer(s) 212, whereas act 303 may be performed by the transport layer 214 and lower layer(s) 215.

For instance, the upper layer(s) 212 access a particular type of message (act 301). The act of accessing could include an act of reading a stored message, an act of modifying a prior message, an act of generating a message, and act of receiving the message from another network location, or any other mechanism that permits the upper layer(s) 212 to access the message.

The particular type of message is one that includes multiple initially parseable components as viewed at a layer above the transport layer in the protocol stack. In this description and in the claims, an "initially parseable component" is any component that may be distinctly recognized as a separately processable component as recognized by the first parsing component that encounters the message when received up a protocol stack from a transport layer. Furthermore, one or more of the initially parseable components may be in compressed form, whereas one or more of the other initially parseable components are either uncompressed, or compressed using a different compression algorithm. The message also includes at least one marker viewable above the transport layer in the protocol stack, the marker identifying each compressed component as being compressed, and the marker being viewable at the layer above the transport layer in the protocol stack (act 301).

Figure 5:
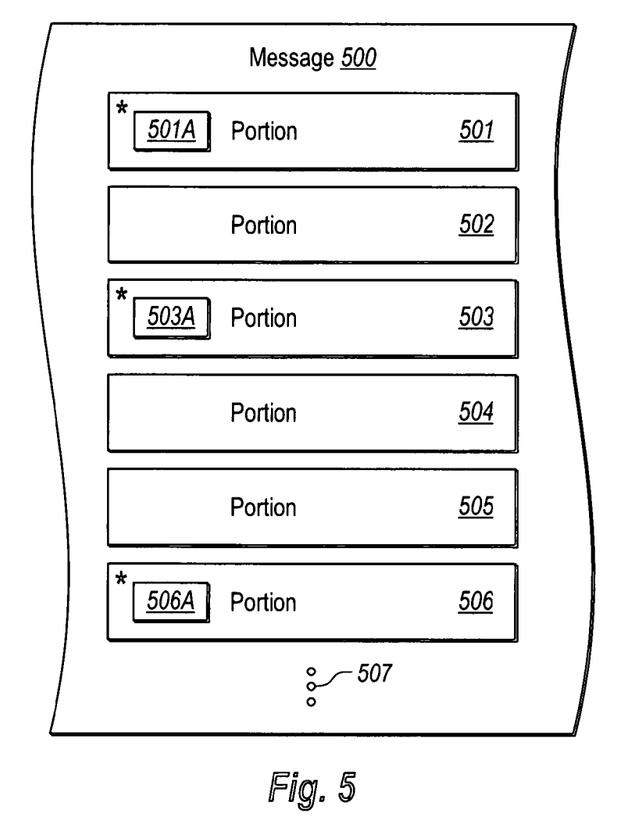
FIG. 5 illustrates a message data structure that includes multiple initially parseable components, several of which being compressed.

FIG. 5 schematically illustrates a message data structure 500 that may represent an example of a message 231 as accessible by the upper layers 212 or 222, and that has the characteristics described for the particular type of message in act 301. The message data structure 500 includes multiple initially parseable components including portions 501 through 506 amongst potentially others as represented by the vertical ellipses 507. One or more of the portions are in compressed form as represented symbolically represented by the asterisk placed in the upper left corner of each portion 501, 503, and 506. Each compressed portion also includes a marker 501A, 503A and 506A, respectively, that each identifies the portion as being compressed. As part of the act of accessing the message (301), the upper layer(s) 212 may also compress the various compressed portions of the message (act 301A). The compression may, for example, be performed by the compression module 213.

Of course, the message data structure 500 is just a schematic illustration presented to illustrate the basic principles of the present invention. There may be any number of initially parseable components, and each compressed module need not have one dedicated marker. Instead, a single marker may be shared amongst multiple compressed components.

Furthermore, FIG. 5 is only an abstract schematic of a message data structure that has multiple initially parseable components, some of which being compressed. Concrete embodiments of the abstract message data structure may vary widely depending on the implementation. Various examples of initially parseable components will be described further below. One type of example is a hierarchically structured message in which messages contain name-value pairs interconnected to form a tree of interconnected name-value pairs. In the examples, that follow, the message may take the form of a SOAP envelope, where the initially parseable components are eXtensible Markup Language (XML) elements that may be distinctly identified using an XML parsing module.

As previously mentioned, the principles of the present invention permit an initially parseable component of a message (e.g., an XML element of a SOAP envelope) to be compressed, without compressing the entire message. For example, consider the following XML element in a SOAP message in which the XML element as yet uncompressed:

<Quote>
Now is the winter of our discontent made glorious summer by this sun of York; and all the clouds that lour'd upon our house in the deep bosom of the ocean buried. Now are our brows bound with victorious wreaths; our bruised arms hung up for monuments; our stem alarums chang'd to merry meetings, our dreadful marches to delightful measures. Grim-visag'd war hath smooth'd his wrinkled front, and now, instead of mounting barbed steeds to fright the souls of fearful adversaries, he capers nimbly in a lady's chamber to the lascivious pleasing of a lute.

</Quote>

This XML element may be compressed in a variety of ways. For instance, the XML element may be compressed as follows:

```
<quote>
    <compress alg="lz">LefFHzjj...</compress>
</quote>
```

Here, the contents of the XML element have been replaced with a compression marker in uncompressed form (here represented by the bounding markers "<compress>" and "</compress>") that contains the compressed data (here represented by "LefFHzjj . . ."). As an alternative, the compression marker may be compressed, but using a compression algorithm that is less processor intensive.

In the example immediately above, the XML element also includes compression metadata in the form of one or more compression parameters. Here, only one of the parameters is specified; namely, the compression algorithm (e.g., the LZ compression algorithm in the example). In the example, the compression algorithm is expressed as an attribute of the XML element that contains the compressed data. Additional compression metadata may be expressed as further attributes of the XML elements, and/or as further XML elements.

The XML element may also be compressed as follows:

```
<quote>
    <compress>
        <alg><lz/></alg>
        <data>LefFHzjj...</data>
    </compress>
</quote>
```

In this case, the compression algorithm is represented by an XML element (here, "<alg><lz/></alg>"). This approach allows additional algorithm-specific metadata to be specified in a structured form. Additional compression metadata may be expressed either as metadata in one of the XML elements, or as additional XML elements. This approach embeds the compression metadata and compressed value inside the compressed element. However, sometimes it may be useful for a preprocessor to quickly locate relevant compression metadata. In another embodiment, the algorithm may be expressed as a Uniform Resource Identifier (URI).

The following two example shows how the compression metadata may be included in uncompressed form in the header portion of a SOAP envelope, for example, as follows (with line numbering added for clarity):

```
1)   <compression>
2)       <compress>
3)           <alg><lz/></alg>
4)           <ref>#xyz</ref>
5)       </compress>
6)   </compression>
7)   ...
8)   <quote ID="xyz">
9)       LefFHzjj...
10)  </quote>
Or
1)   <compression>
2)       <compress>
3)           <alg><lz/></alg>
4)           <ref>#xyz</ref>
5)       </compress>
6)   </compression>
7)   ...
8)   <CompressedData ID="xyz">
9)       LefFHzjj...
10)  </CompressedData>
```

In this example, the compression metadata is stored in an XML element (lines 1-6 in both examples) of a SOAP header, and references the element that is compressed. Here the element's value was replaced with its compressed form. For instance, line 4 in the example points to the XML element that contains the reference value "xyz". The compressed XML element includes an identifying attribute (e.g., in line 8 of both examples) identifying the XML element as corresponding to that value.

In some cases the amount of data being compressed may be large. Consequently, encoding it to be placed inside an XML element may not be that efficient. The mechanism may permit compressed data to be passed in an attachment. For example:

```
<quote>
    <compress>
        <alg><lz/></alg>
        <ref>cid:attachment-1</ref>
    </compress>
</quote>
```

Here, the compression metadata is placed inside the compressed element, but it points to the compressed binary data inside an attachment.

In the following example, an attachment itself has been compressed. Here the compression metadata is placed inside of a header to manifest the compression.

```
<compression>
    <compress>
        <alg><lz/></alg>
        <ref>cid:attachment-2</ref>
    </compress>
</compression>
```

As a side note, when digital signatures are used in messages the sender "signs" the data being sent. Consequently, if the data being signed is compressed data, then the compressed form is being signed. There are times when the desire is to sign the uncompressed form. In order to establish appropriate ordering semantics where the compression is placed in context with one or more other transformations, the compression metadata may specify ordering semantics for use in identifying a proper order to perform the reverse transformations when decompressing.

Some forms of compression are semantically lossless, but technically lossy in that they alter the meaning of the text. Canonicalization can address some of this, but not everything. For example, <a:foo xmlns:a="uril"/> and <b:foo xmlns:b="uril"/> are semantically equivalent, but will have different signature digests using most common techniques.

The compression metadata may also contain a compression map. Some compression algorithms make use of compression maps. That is, they use special markers to denote certain information (dictionaries). In some cases, such as XML, there are "standard" markers. For example, markers could refer to XML namespaces or even XML elements. In such cases, this static data can be published and shared thereby eliminating the requirement to include the map in the compressed result (making it even smaller). To facilitate this, a compression map may be published or negotiated so as to reduce transmissions even further and, when embedded into applications, decrease processing time.

Compression maps contain various kinds of data such as namespaces, elements, or even XML fragments.

One example embodiment for a compression map is as follows:

```
<compressionMap name=...>
    <mapNs key="..." ns="..." uri="..."/>
    <mapElement key="..." ele="..."/>
    <mapXML key="...">...</mapXML>
    ...
</compressionMap>
```

Here, a mapping between long terms (such namespaces, elements, and even common XML fragments) may be made with smaller keys that may serve as a substitute for the longer terms. Parameterized XML substitutions that can be used by compression algorithms. In another example, the compression map may be defined by a macro.

Referring back to FIG. 5, the compressed components may each be compressed using a different compression algorithm. For instance, information that is more immediately needed and smaller may be compressed using a compression algorithm that is easier to access from a processing standpoint, but perhaps has a smaller compression ratio. Thus, compressed component 501 may be compressed using a first compression algorithm, compressed component 503 may be compressed using a second compression algorithm, and compressed component 506 may be compressed using a third compression algorithm.

Accordingly, the message is in a form that compression may occur at a layer above the transport layer. Thus, part of the message may be compressed while leaving other portions uncompressed, or perhaps compressed using a different compression algorithm.

Returning to FIG. 3, once the message is accessed (act 301), the message is passed down a protocol stack to a transport layer protocol module in preparation for transmission of the message (act 302). For instance, the message 231 may be passed by upper layer(s) 212 to the transport layer 214. The message is then transmitted (act 303). For instance, the transport layer 214 passes the message to the lower layer(s) 215, which then physically transmit the message 231 on the network 230.

Figure 4:
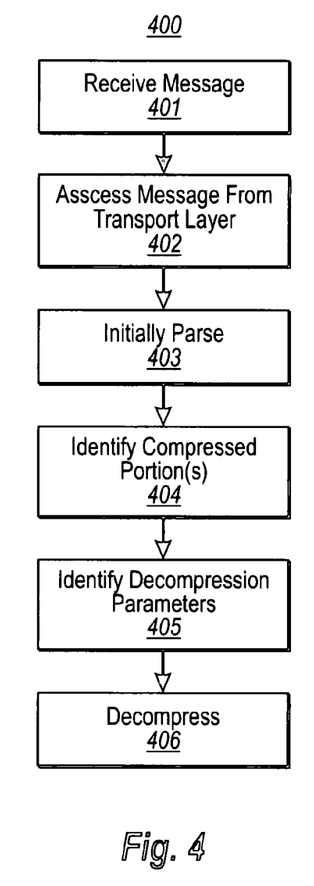
FIG. 4 illustrates a flowchart of a method for receiving and decompressing the message of FIG. 3 at above the transport layer in accordance with the principles of the present invention.

FIG. 4 illustrates a flowchart of a method 400 for receiving and decompressing the message in accordance with the principles of the present invention. First, the message is received by the receiving computing system (act 401). For instance, the lower layer(s) 225 physically receive the message 231 from the network 230, and pass the message to the transport layer 224.

The upper layer module(s) 222 then accesses the received message (act 402) from the transport layer module 224. The upper layer(s) 222 then initially parse the message to extract the various compressed and uncompressed components of the message (act 403). The marker may be used to identify which components of the message are compressed (act 404). The decompression parameters of the compressed components of the message are then identified (act 405) based on, for example, the compression metadata present in the message. The upper layer(s) 222, and more specifically the decompression module 223, may then decompress the portions of the message (act 406).

Accordingly, an efficient mechanism for compressing and decompressing portions of a message at above the transport layer have been described. Since some of the message may be uncompressed, or compressed in a more accessible form, some of the message may be quickly accessed. On the other hand, other portions of the message may be compressed using more aggressive compression mechanisms, thereby significantly reducing the size of the message, and thereby preserving network and storage bandwidth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable media having thereon computer-executable instructions for executing a method for compressing a portion of a message at a layer above a transport layer in a protocol stack, the method comprising:

an act of accessing a message, the message being in a form that allows compression to occur at a layer above the transport layer in the protocol stack, the message including a plurality of initially parseable components as viewed at at least one of the application layer, the presentation layer and the session layer above the transport layer in the protocol stack, at least one, but not all, of the initially parseable components being in compressed form, the message including a plurality of markers, wherein each compressed component is separately identified by its own marker as being compressed, the markers being viewable at at least one of the application layer, the presentation layer and the session layer above the transport layer in the protocol stack; and an act of passing the message down the protocol stack from at least one of the application layer, the presentation layer and the session layer to a transport layer protocol module in preparation for transmission of the message.

2. A computer program product in accordance with claim 1, wherein the transport layer protocol comprises a HyperText Transport Protocol (HTTP) protocol.

3. A computer program product in accordance with claim 1, wherein the layer above the transport layer is a Simple Object Access Protocol (SOAP) protocol.

4. A computer program product in accordance with claim 1, wherein each of the initially parseable components comprises an extensible Markup Language (XML) representation.

5. A computer program product in accordance with claim 4, wherein an XML element corresponding to a compressed element includes a marker in uncompressed form to indicate that the element is in compressed form, and a content portion containing the compressed content.

6. A computer program product in accordance with claim 5, wherein the XML element further comprises one or more compression parameters specifying at least a compression algorithm for compressing the content portion of the XML element.

7. A computer program product in accordance with claim 5, wherein the message includes a header portion that includes compression parameters specifying one or more compression parameters specifying at least a compression algorithm for compressing the content portion of the XML element.

8. A computer program product in accordance with claim 1, wherein the message includes a primary message and at least one attachment, wherein the primary message specifies one or more compression parameters specifying at least a compression algorithm for compression of a content portion, and wherein the content portion is part of the attachment.

9. A computer program product in accordance with claim 1, wherein an uncompressed portion of the message includes an identification of ordering semantics for how decompression should be performed in the context of one or more other transformations.

10. A computer program product in accordance with claim 1, wherein an uncompressed portion of the message identifies a compression map.

11. A computer program product in accordance with claim 10, wherein the compression map expressly identifies one or more mappings.

12. A computer program product in accordance with claim 1, wherein the compression map identifies one or more mappings using a reference to the compression map, but without expressly identifying the one or more mappings.

13. A computer program product in accordance with claim 1, wherein the plurality of initially parseable components includes at least a first and second parseable component, wherein the first parseable component is compressed using a first compression algorithm, and the second parseable component is compressed using a second compression algorithm that requires a different compression algorithm than the first compression algorithm.

14. A computer program product in accordance with claim 13, wherein the plurality of initially parseable components includes a third parseable component that is compressed using a third compression algorithm that is different than the first and second compression algorithms.

15. The method of claim 1, wherein each marker is compressed using a computationally simplistic compression algorithm.

16. The method of claim 1, wherein at least two of the application layer, the presentation layer and the session layer are used to compress the message.

17. A computer program product comprising one or more computer-readable media having thereon computer-executable instructions for executing a method for decompressing a portion of a message at above a transport layer in a protocol stack, the method comprising:

an act of accessing a received message from a transport layer module, the message being in a form that allows compression to occur at a layer above the transport layer in the protocol stack, the message including a plurality of initially parseable components as viewed at at least one of the application layer, the presentation layer and the session layer above the transport layer in the protocol stack, at least one, but not all, of the initially parseable components being in compressed form, the message including a plurality of makers, wherein each compressed component is separately identified by its own marker as being compressed, the markers being viewable at at least one of the application layer, the presentation layer and the session layer above the transport layer in the protocol stack;

an act of initially parsing the message;

an act of using the markers to identify the marker's corresponding one or more compressed components of the message as being in compressed form based on the marker;

an act of identifying the decompression parameters of the compressed components of the message; and an act of decompressing the compressed portions of the message as identified by the corresponding markers.

18. A computer program product in accordance with claim 17, wherein the decompression parameters of the compressed components of the message are identified based on compression metadata present in the message.

19. One or more computer-readable media having thereon computer-executable instructions, that when executed by a processor, implement a method for configuring a simple object access protocol (SOAP) envelope for transmission, the method comprising:

an act of accessing a first SOAP envelope, the SOAP envelope being in a form that allows compression to occur at a layer above the transport layer in the protocol stack, the SOAP envelope including a plurality of initially parseable extensible markup language (XML) components as viewed by the SOAP protocol, at least one, but not all, of the initially parseable XML components being in compressed form, the first SOAP envelope including a plurality of markers, wherein each compressed XML component is separately identified by its own marker as being compressed, the markers of the first SOAP envelope being viewable by the SOAP protocol;

an act of passing the first SOAP envelope down the protocol stack from at least one of the application layer, the presentation layer and the session layer to a transport layer protocol module in preparation for transmission of the first SOAP envelope;

an act of accessing a second SOAP envelope from the transport layer module after the second SOAP envelope had been received, the second SOAP envelope also including a plurality of initially parseable XML components as viewed by the SOAP protocol, at least one, but not all, of the initially parseable XML components being in compressed form, the second SOAP envelope including a plurality of markers, wherein each compressed XML component is separately identified by its own marker as being compressed;

an act of initially parsing the second SOAP envelope using an XML parser; and an act of using a second marker to identify the one or more compressed XML components of the second SOAP envelope as being in compressed form based on the second marker.

20. A computer program product in accordance with claim 19, wherein the one or more computer-readable media are physical memory and/or storage media.

* * * * *